United States Patent
Tojo

(10) Patent No.: US 8,361,213 B2
(45) Date of Patent: Jan. 29, 2013

(54) INK COMPOSITION AND IMAGE RECORDING METHOD

(75) Inventor: Kaoru Tojo, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 726 days.

(21) Appl. No.: 12/400,249

(22) Filed: Mar. 9, 2009

(65) Prior Publication Data

US 2009/0232989 A1     Sep. 17, 2009

(30) Foreign Application Priority Data

Mar. 13, 2008  (JP) ................................. 2008-064547

(51) Int. Cl.
*C09D 11/10* (2006.01)

(52) U.S. Cl. ................. 106/31.65; 106/31.6; 106/31.85; 106/31.86; 106/31.9; 427/384; 428/195.1; 524/211; 524/515; 524/522; 524/523

(58) Field of Classification Search .................. 427/256
See application file for complete search history.

(56) References Cited

U.S. PATENT DOCUMENTS

| | | | | |
|---|---|---|---|---|
| 5,085,698 | A * | 2/1992 | Ma et al. ........................ | 524/388 |
| 5,503,664 | A * | 4/1996 | Sano et al. ...................... | 524/27 |
| 6,538,047 | B1 * | 3/2003 | Miyabayashi ................. | 523/160 |
| 6,790,878 | B2 * | 9/2004 | Kurabayashi ................. | 523/160 |
| 7,345,100 | B2 * | 3/2008 | Iwamoto et al. .............. | 523/161 |
| 2005/0004261 | A1 | 1/2005 | Yatake | |
| 2005/0024458 | A1 * | 2/2005 | Sanada et al. ................. | 347/100 |
| 2005/0176847 | A1 | 8/2005 | Cagle | |
| 2006/0052481 | A1 | 3/2006 | Watanabe et al. | |
| 2006/0155006 | A1 * | 7/2006 | Nakamura et al. ............ | 523/160 |
| 2007/0037901 | A1 * | 2/2007 | Kanaya et al. ................ | 523/160 |
| 2008/0146729 | A1 | 6/2008 | Yatake | |
| 2008/0151027 | A1 * | 6/2008 | Held et al. ..................... | 347/100 |
| 2009/0220748 | A1 * | 9/2009 | Kanaya et al. ............. | 428/195.1 |
| 2009/0322842 | A1 * | 12/2009 | Kosydar et al. ............... | 347/100 |
| 2011/0166273 | A1 | 7/2011 | Yatake | |

FOREIGN PATENT DOCUMENTS

| | | |
|---|---|---|
| EP | 0 569 864 A1 | 11/1993 |
| EP | 1 077 238 A1 | 2/2001 |
| EP | 1 213 332 A1 | 6/2002 |
| EP | 1 595 923 A1 | 11/2005 |
| GB | 2 108 991 A | 5/1983 |
| JP | 2001-123098 A | 5/2001 |
| JP | 2002-030235 A | 1/2002 |
| JP | 2003-213179 A | 7/2003 |
| JP | 2005-220352 A | 8/2005 |
| JP | 2005-272790 A | 10/2005 |
| JP | 2006-273891 A | 10/2006 |
| JP | 2007-145928 A | 6/2007 |
| WO | 2008/045549 A1 | 4/2008 |

OTHER PUBLICATIONS

"Solubility Parameters: Theory and Application" authored by Burke that published in AIC Book and Paper Group Annual, vol. 3, 1984, Craig Jensen, Editor, p. 13-58, the contents of which were made available at http://cool.conservation-us.org/coolaic/sg/bpg/annual/v03/bp03-04.html.*
Solubility parameter for diethylene glycol in Polymer Handbook, 4th Edition, © 1999,2005 John Wiley and Sons.*
EP Communication, dated Jun. 5, 2009, issued in corresponding EP Application No. 09154981.6, 5 pages.
Robert F. Fedors, "A Method for Estimating Both the Solubility Parameters and Molar Volumes of Liquids", Polymer Engineering Science, vol. 14, No. 2, 1974, pp. 147-154.
Office Action dated Sep. 25, 2012 on Japanese Application No. JP 2008-064547.

* cited by examiner

*Primary Examiner* — Marc Zimmer
(74) *Attorney, Agent, or Firm* — Sughrue Mion, PLLC

(57) ABSTRACT

The present invention provides an ink composition comprising pigment particles covered with a water-insoluble resin, resin particles, a water-soluble organic solvent, water, and a solid wetting agent in an amount of 5% by mass or more.

7 Claims, No Drawings

INK COMPOSITION AND IMAGE RECORDING METHOD

CROSS-REFERENCE TO RELATED APPLICATION

This application claims priority under 35 USC 119 from Japanese Patent Application No. 2008-064547, the disclosure of which is incorporated by reference herein.

BACKGROUND

1. Field of the Invention

The present invention relates to an ink composition and an image recording method.

2. Related Art

As a recording medium for an ink used for the inkjet recording, for example, various technologies for obtaining high quality products having a high color density, fixability, resolution and a good curling property after recording, have been studied.

As coloring agents, pigments are widely used for inkjet recording ink from the viewpoint of light fastness, water resistance and the like. When pigment is used by being dispersed, technologies for improving the stability of the dispersion after dispersed, the homogeneity of the dispersed pigment particle size, and the ejection property have been studied.

In relation to the above, as an ink composition with low bronzing phenomena and a high fixability and abrasion resistance, an ink composition containing a colorant covered with a water-insoluble polymer, resin particles and a solid wetting agent has been known (for example, see, Japanese Patent Application Laid-Open (JP-A) No. 2006-273891.

SUMMARY

The present invention has been made in view of the above circumstances and provides an ink composition and an image recording method.

A first aspect of the invention provides an ink composition comprising pigment particles covered with a water-insoluble resin, resin particles, a water-soluble organic solvent, water, and a solid wetting agent in an amount of 5% by mass or more.

DETAILED DESCRIPTION OF THE INVENTION

—Ink Composition—

The ink composition of the present invention contains pigment particles covered with a water-insoluble resin, resin particles, a water-soluble organic solvent, water and a solid wetting agent in an amount of 5% by mass or more.

When an ink composition has the composition of the present invention, the stability of the pigment dispersion, the fixability to a recording medium and wiping-off property are improved.

Accordingly, when the ink composition is dried and solidified in the vicinity of a nozzle, the ink composition can be easily wiped off, so that the maintenance property of the nozzle can be improved.

Hereinafter, each component contained in the ink composition of the invention will be described.

<Pigment Particles Covered with Water-Insoluble Resin>

The ink composition of the present invention contains at least one kind of pigment particles covered with water-insoluble resin. Accordingly, the ink composition of the invention is excellent in dispersion stability.

Although the configuration of the pigment particles in the invention is not specifically restricted as long as all or a part of the surface of the pigment particles is covered with a water-insoluble resin, for example, the configuration of the following encapsulated pigment particles is desirable.

Encapsulated pigment particles are a polymer emulsion formed by incorporating pigment into polymer particles, and more specifically, the surface of pigment particles is covered with a hydrophilic water-insoluble resin to hydrophilicize the surface of the pigment particles, and the pigment particles are dispersed in water.

The resin for the microencapsulated pigment particles is not specifically limited, but is preferably polymer compounds that have a self-dispersible ability or a dissolving ability in a mixed solvent of water and a water-soluble organic solvent, and have an anionic group (acidity). In general, the number average molecular weights of the resin is preferably in the range of about 1,000 to about 100,000, and particularly preferably in the range of about 3,000 to about 50,000. Further, the resin is preferably dissolved in an organic solvent to form a solution. When the number average molecular weight of the resin is in the above range, the resin can fully exhibit the function as a cover layer on pigment particles or as a layer for when the resin is used in an ink composition. The resin is used desirably in the form of an alkali metal salt or an organic amine salt.

Examples of the resins for the microencapsulated pigment particles include materials having an anionic group including thermoplastic, thermosetting, or modified resin such as an acrylic resin, an epoxy resin, a polyurethane resin, a polyether resin, a polyamide resin, an unsaturated polyester resin, a phenol resin, a silicone resin or a fluorine-based polymer compound; polyvinyl resins such as vinyl chloride, vinyl acetate, polyvinyl alcohol or polyvinyl butyral; polyester resins such as an alkyd resin or a phthalic resin, amino-based materials such as a melamine resin, a melamine-formaldehyde resin, an aminoalkid co-condensed resin, a urea resin, or a urea formaldehyde resin, or a copolymer or mixture of these resins.

In the above resins, the anionic acrylic resins can be obtained by polymerizing anionic acrylic monomers having an anionic group (hereinafter, referred to as an anionic group-containing acrylic monomer), and other monomers copolymerizable with the anionic group-containing acrylic monomers in a solvent, as occasion demands. Examples of the acrylic group-containing monomers include, for example, acrylic monomers having one or more anionic groups selected from the group consisting of a carboxyl group, a sulfonic acid group and a phosphonic group. In particular, acrylic monomers having a carboxyl group are desirable.

Examples of the acrylic monomer having a carboxyl group include preferably acrylic acid, methacrylic acid, crotonic acid, ethacrylic acid, propyl acrylic acid, isopropyl acrylic acid, itaconic acid and fumaric acid. In particular, acrylic acid or methacrylic acid is desirable.

Microencapsulated pigment particles can be manufactured by a conventional physical or chemical method using the above components. According to a preferable exemplary embodiment of the invention, the microencapsulated pigment particles can be manufactured by the methods described in JP-A Nos. 9-151342, 10-140065, 11-209672, 11-172180, 10-25440, or 11-43636.

Specifically, the phase-inversion emulsifying method, the aciding out method and the like described in JP-A Nos. 9-151342 and 10-140065 are exemplified.

Here, the phase-inversion emulsifying method and the aciding out method are explained.

(a)—Phase-Inversion Emulsifying Method—

The phase-inversion emulsifying method is a self-dispersion (phase-inversion emulsification) method in which a mixed molten product of a resin having self-dispersiblity or solubility and a pigment is fundamentally dispersed in water. Further, the mixed molten product may contain a curing agent or a polymer compound. Here, the mixed molten product means a mixed state without being dissolved, a mixed state with being dissolved, or the both states thereof. More concrete method of the "phase-inversion method" is described in JP-A No. 10-140065.

(b)—Aciding Out Method—

The aciding out method is a method of manufacturing a microencapsulated pigment particles, in which a hydrous cake containing a resin and a pigment is prepared, and all or a part of acidic groups in the resin in the hydrous cake is neutralized using a basic compound.

The aciding out method includes a (1) step of dispersing a resin and a pigment in an aqueous alkaline medium to gel the resin, if needed, by heat-treating the dispersion, (2) a step of firmly adhering the resin to the surface of the pigment particles by making the pH neutral or acidic, and hydrophobicizing the resin, (3) a step of obtaining a hydrous cake by filtrating and washing, if necessary, (4) a step of neutralizing all or a part of the anionic groups of the resin in the hydrous cake with a basic compound, and thereafter re-dispersing in an aqueous medium, and (5) a step of gelling the resin by heating, if necessary.

More specific methods of the phase-inversion emulsifying method and the aciding out method can be referred to JP-A Nos. 9-151342, and 10-140065.

As the "pigment particles covered with a water-insoluble resin" contained in the ink composition of the invention, the pigment particles covered with the water-insoluble resin formed by the phase-inversion emulsifying method are preferable from the viewpoint of the dispersion stability. That is, the pigment is desirably dispersed with a water-insoluble resin as a dispersant using the phase-inversion emulsifying method.

Next, the pigment and water-insoluble resin of the invention will be described.

(Pigment)

Pigments usable in the invention are not specifically restricted, but can be appropriately selected in accordance with the intended use. For example, both organic pigments and inorganic pigments can be used.

Examples of the organic pigments include, for example, azo pigments, polycyclic pigments, dye chelates, nitro pigments, nitroso pigments and aniline black. In particular, azo pigments, polycyclic pigments and the like are desirable.

The azo pigments include, for example, an azo lake pigment, an insoluble azo pigment, a condensed azo pigment and a chelate azo pigment.

The polycyclic pigments include, for example, a phthalocyanine pigment, a perylene pigment, a perynone pigment, an anthraquinone pigment, a quinacridone pigment, a dioxazine pigment, an indigo pigment, a thioindigo pigment, an isoindolinone pigment and a quinofuraron pigment.

The dye chelates include, for example, basic dye chelates and acid dye chelates.

The inorganic pigments include, for example, titanium oxide, iron oxide, calcium carbonate, barium sulfate, aluminum hydroxide, barium yellow, cadmium red, chrome yellow and carbon black. Among them, carbon black is particularly desirable. In addition, carbon blacks manufactured by known methods such as the contact method, the furnace method or the thermal method are exemplified.

Black pigments, specific examples of carbon black include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 and RAVEN700 ((all are trade names) manufactured by Columbian Carbon Company); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 ((all are trade names) manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECKIAL BLACK 6, SPECKIAL BLACK 5, SPECKIAL BLACK 4A and SPECKIAL BLACK 4 ((all are trade names) manufactured by Degussa); No. 25, No. 33, No. 40, No. 45, No. 47, No. 52, No. 900, No. 2200B, No. 2300, MCF-88, MA600, MA7, MA8 and MA100 ((all are trade names) manufactured by Mitsubishi Chemical Corporation). However, the black pigments are not limited thereto.

As organic pigments, yellow ink pigments include, for example, C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 and 180.

Further, magenta ink pigments include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 and C.I. Pigment Violet 19. Among them, C.I. Pigment Red 122 is particularly preferable.

Furthermore, cyan ink pigments include, for example, C.I. Pigment Blue 1, 2, 3, 15, 15:1, 15:2, 15:3, 15:34, 16, 17:1, 22, 25, 56, 60, and C.I. Bat Blue 4, 60 and 63. In particular, C. I. Pigment Blue 15:3 is preferable.

The pigments may be used singly, or may be used in combination of two or more kinds of pigments selected from each group, or from plural groups.

(Water-Insoluble Resin)

In the invention, the water-insoluble resin for covering the pigment particles is not specifically restricted, but water-insoluble resins having a hydrophilic structural unit (a) and a hydrophobic structural unit (b) are desirable. Other structural units which are not included in the hydrophilic structural unit (a) and the hydrophobic structural unit (b) may be optionally contained.

The water-insoluble resin is a resin which has a solubility of 1 g or less in water, when it is completely (100%) neutralized with sodium hydroxide or acetic acid according to the type of the salt-forming group of the specific water-insoluble resin, dried at 105° C. for 2 hours and then dissolved in 100 g of water at 25° C.

—Hydrophilic Structural Unit (a)—

As long as the hydrophilic structural unit (a) is derived from a monomer containing a hydrophilic group, the hydrophilic structural unit (a) is not specifically restricted, but may be derived from a monomer containing one kind of a hydrophilic group, or may be derived from a monomer containing two or more kinds of hydrophilic groups. The hydrophilic group is not specifically restricted, but may be a dissociative group, or a nonionic hydrophilic group.

A dissociative group and/or a nonionic hydrophilic group by using a monomer having a dissociative group (dissociative group-containing monomer) and/or a monomer having a nonionic hydrophilic group may be introduced into the water-insoluble resin in the invention.

The dissociative group is desirable from the viewpoint of the stability of an emulsified state or a dispersed state. The dissociative group includes a carboxyl group, a phosphoric group and a sulfonic group, in particular, a carboxyl group is desirable from the viewpoint of the dispersion stability when an ink composition is formed.

As the hydrophilic group-containing monomer, a dissociative group-containing monomer is desirable, and the dissociative group-containing monomer having a dissociative group and an ethylenic unsaturated bond is more desirable. The dissociative group-containing monomers include, for example, an unsaturated carboxylic acid monomer, an unsaturated sulfonic acid monomer, an unsaturated phosphoric acid monomer, and the like.

The unsaturated carboxylic acid monomers include, for example, acrylic acid, methacrylic acid, crotonic acid, itaconic acid, maleic acid, fumaric acid, citraconic acid, and 2-methacryloyloxymethyl succinic acid. The unsaturated sulfonic acid monomer includes, for example, styrene sulfonic acid, 2-acrylamide-2-methylpropane sulfonic acid, 3-sulfopropyl(meth)acrylate, and bis-(3-sulfopropyl)-itaconate. The unsaturated phosphoric acid monomer includes, for example, vinyl phosphonic acid and, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

In the dissociative group-containing monomers, an unsaturated carboxylic acid monomer is preferable, and an acrylic acid and a methacrylic acid are more preferable from the viewpoint of the dispersion stability and ink ejection stability.

That is, the hydrophilic structural unit (a) contains preferably the structural unit derived from (meth)acrylic acid.

As other hydrophilic structural units (a), a structural unit derived from a monomer having a nonionic hydrophilic group may be used. The monomers for forming a structural unit having a nonionic hydrophilic group are not specifically restricted as long as the monomer contains a functional group that can form a polymer such as an ethylenic unsaturated bond or the like, and a nonionic hydrophilic functional group, and can be selected from known monomers. The monomers are preferably vinyl monomers from the viewpoint of the availability, the handling property and the versatility.

Examples of the hydrophilic structural units (a) include vinyl monomers having a hydrophilic functional group such as (meth)acrylates, (meth)acrylamides, or vinyl esters having a hydrophilic functional group.

Here, the "hydrophilic functional group" includes a hydroxyl group, an amino group, an amide group (no substituent on nitrogen atom), and alkyleneoxide such as polyethylene oxide, or polypropylene oxide, which will be described later.

Specific examples of the hydrophilic structural units (a) include, for example, hydroxyethyl(meth)acrylate, hydroxybutyl(meth)acrylate, (meth)acrylamide, aminoethyl acrylate, aminopropyl acrylate, and (meth)acrylate containing an alkyleneoxide polymer.

The hydrophilic structural unit having a nonionic hydrophilic group can be formed by polymerizing monomers corresponding to the structural unit, but the hydrophilic functional group may be introduced into the polymer chain after polymerization.

The hydrophilic structural unit having a nonionic hydrophilic group is more preferably a hydrophilic structural unit having an alkyleneoxide structure. The alkylene moiety in the alkyleneoxide structure is preferably an alkylene moiety having 1-6 carbon atoms, more preferably an alkylene moiety having 2-6 carbon atoms, and further more preferably an alkylene moiety having 2-4 carbon atoms, from the viewpoint of the hydrophilicity. Moreover, the polymerization degree of the alkyleneoxide structure is preferably from 1 to 120, more preferably from 1 to 60, and still more preferably from 1 to 30.

The hydrophilic structural unit having a nonionic hydrophilic group is also desirably a hydrophilic structural unit containing a hydroxyl group. The number of the hydroxyl groups in the structural unit is not specifically limited, but the number of the hydroxyl groups is preferably from 1 to 4, more preferably from 1 to 3, and particularly preferably from 1 to 2, from the viewpoint of the hydrophilicity of the water-insoluble resin and the compatibility with a solvent or other monomers at the time of polymerization.

In the above, the content ratio of the hydrophilic structural unit varies with the ratio of the hydrophobic structural unit (b), which will be described later. For example, when the water-insoluble resin consists of only acrylic acid and/or methacrylic acid [hydrophilic structural unit (a)] and a hydrophobic structural unit (b), which will be described later, the content ratio of acrylic acid and/or methacrylic acid is obtained from the formula "100−(mass % of hydrophobic structural unit)".

The hydrophilic structural unit (a) may be used singly, or two or more kinds may be mixed and used.

The content ratio of the hydrophilic structural unit (a) is preferably from more than 0% by mass to 15% by mass, more preferably from 2% by mass to 15% by mass, further more preferably 5% by mass to 15% by mass, and still more preferably 8% by mass to 12% by mass, with respect to the total mass of the water-insoluble resin.

—Hydrophobic Structural Unit (b)—

The hydrophobic structural unit (b) is desirable to include a structural unit having an aromatic ring bonded to an atom forming the main chain of the structural unit via a linking group.

In such a structural unit having an aromatic ring, since the aromatic ring is bonded to an atom forming the main chain of the water-insoluble resin via a linking group and the aromatic ring is not directly bonded to an atom for forming the main chain of the water-insoluble resin, the distance between the hydrophobic aromatic ring and the hydrophilic structural unit can be appropriately maintained, so that an interaction between the water-insoluble resin and pigment particles tends to arise, the resin is firmly adsorbed to the pigment particles, and the dispersibility can further be improved.

In the "structural unit having an aromatic ring bonded to an atom forming the main chain of the structural unit via a linking group", the structural unit represented by the following formula (2) is preferable, from the viewpoint of facilitating microparticulation of the pigment.

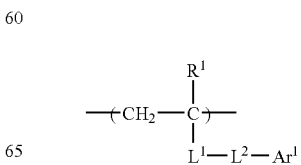

Formula (2)

In the formula (2), $R^1$ represents a hydrogen atom, a methyl group or a halogen atom, $L^1$ represents *—COO—, *—OCO—, *—CONR$^2$—, *—O—, or a substituted or unsubstituted phenylene group, $R^2$ represents a hydrogen atom, an alkyl group having 1-10 carbon atoms. Here, the notation * in the groups represented by $L^1$ represents a bond to be connected to the main chain. The substituents of the substituted phenylene group are not specifically restricted, but, for example, include a halogen atom, an alkyl group, an alkoxy group, a hydroxyl group and a cyano group.

$L^2$ represents a single bond or a divalent linking group having 1-30 carbon atoms, and in the case of a divalent linking group, the linking group is preferably a linking group having 1-25 carbon atoms, more preferably a linking group having 1-20 carbon atoms, still more preferably a linking group having 1-15 carbon atoms. Particularly preferably, the linking group is an alkyleneoxy group having 1-25 (more preferably 1-10) carbon atoms, an imino group (—NH—), a sulfamoyl group, a divalent linking group including an alkylene group such as an alkylene group having 1-20 (more preferably 1-15) carbon atom, or an ethyleneoxide group [—($CH_2$—$CH_2$—O)$_n$—, n=1-6], and a group formed by combining two or more of the groups.

In the formula (2), $Ar^1$ represents a monovalent group derived from an aromatic ring.

The aromatic ring represented by $Ar^1$ in the formula (2) is not particularly limited, but a benzene ring, a ring-fused aromatic ring having 8 or more carbon atoms, an aromatic ring ring-fused with heterocyclic ring, or benzene rings formed by connecting two or more benzene rings is exemplified. Details of the ring-fused aromatic ring having 8 or more carbon atoms, and the aromatic ring ring-fused with a heterocyclic ring are described hereinbefore.

In the structural units represented by the formula (2), a combination of structural units, in which $R^1$ is a hydrogen atom or a methyl group, $L^1$ is *—COO—, and $L^2$ is a divalent linking group having 1-25 carbon atoms containing an alkyleneoxy group and/or an alkylene group, is preferable, and a combination of structural units, in which $R^1$ is a hydrogen atom or a methyl group, $L^1$ is *—COO—, $L^2$ is *—($CH_2$—$CH_2$—O)$_n$— (n represents an average repeating number, and n=1-6) is particularly preferable.

The "ring-fused aromatic ring having 8 or more carbon atoms" is an aromatic compound having 8 or more carbon atoms constituted by at least an aromatic ring formed by ring-fusing two or more benzene rings, or a ring formed by at least one kind of aromatic rings and an alicyclic hydrocarbon ring-fused with the aromatic ring. Specific examples thereof include naphthalene, anthracene, fluorene, phenanthrene and acenaphthene.

The "aromatic ring fused with a heterocyclic ring" is a compound, in which an aromatic compound (preferably a benzene ring), which does not contain a hetero atom, is ring-fused with a cyclic compound containing a hetero atom. Here, the cyclic compound containing a hetero atom is preferably a 5-membered ring or a 6-membered ring. As the hetero atom, a nitrogen atom, an oxygen atom, or a sulfur atom is preferred. The cyclic compound containing a hetero atom may contain plural hetero atoms. In this case, the hetero atoms may be the same, or may be different from each other. Specific examples of the aromatic ring ring-fused with a heterocyclic ring include phthalimide, acridone, carbazole, benzoxazole and benzothiazole.

Hereinafter, examples of the monomer capable of forming the structural units represented by the formula (2) are exemplified. However, the present invention is not restricted to these examples.

M-1

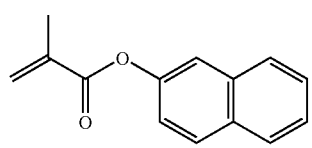

M-2

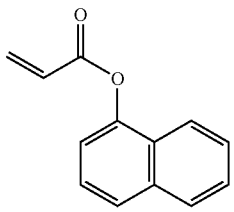

M-3

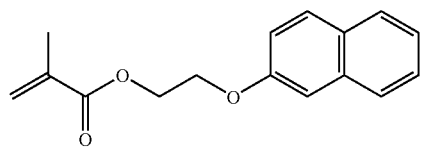

M-4

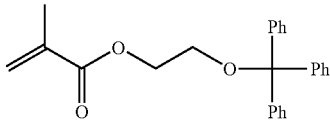

M-5

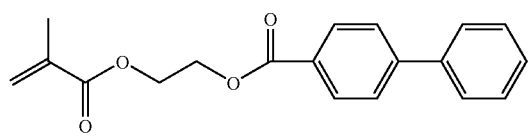

M-6

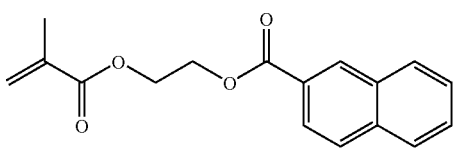

M-7

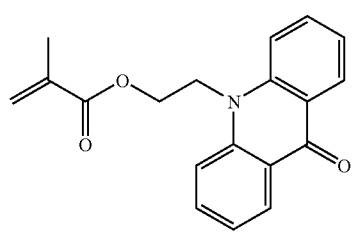

M-8

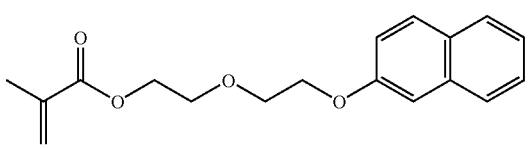

-continued
M-9
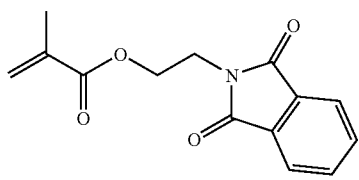
M-10
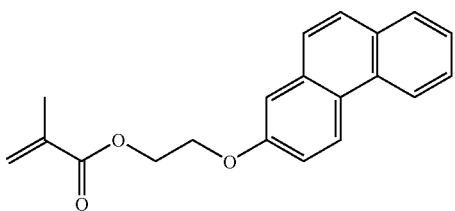
M-11
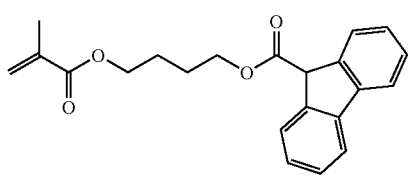
M-12
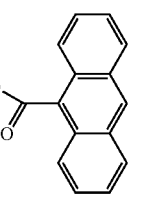
M-13
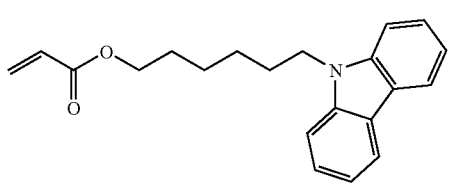
M-14
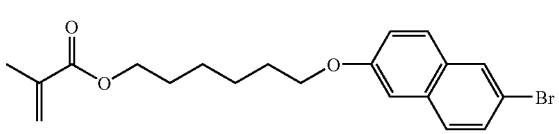
M-15
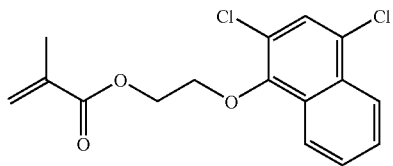
M-16
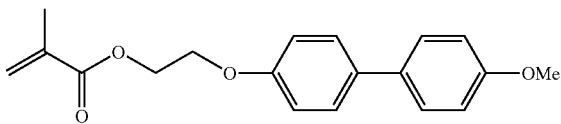
M-17
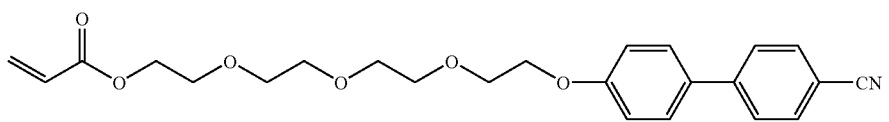
M-18
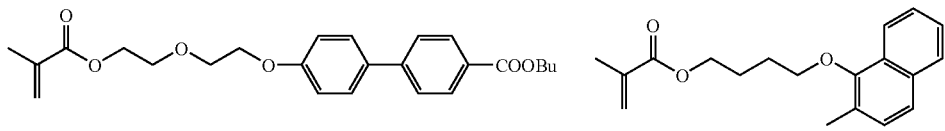
M-19
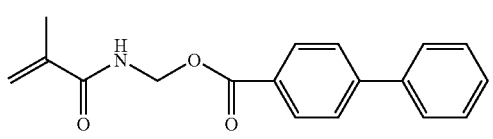
M-20
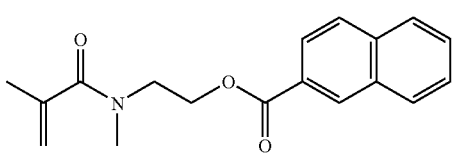
M-21
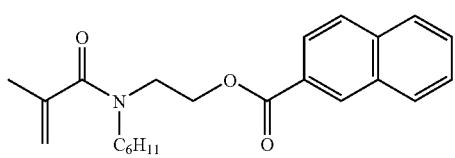
M-22
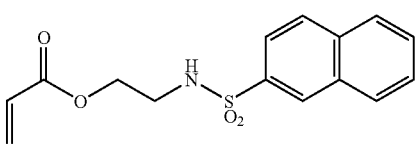
M-23

M-24

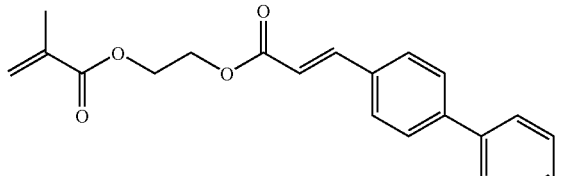

M-25

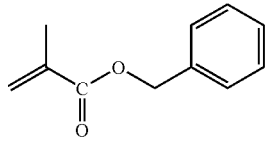

M-26

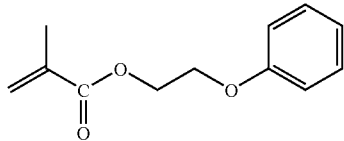

M-27

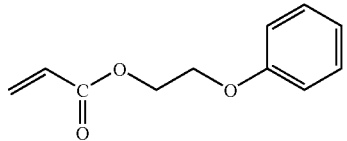

Among the structural units represented by the formula (2), the structural units derived from the compounds selected from benzyl methacrylate, phenoxy ethylacrylate and phenoxy ethylmethacrylate are preferable from the viewpoint of the dispersion stability. The water-insoluble resin of the invention has preferably one kind or two or more kinds of the structural units selected from these structural units as a hydrophobic structural unit (b).

The content ratio of "the hydrophobic structural unit having an aromatic ring bonded to an atom for forming the main chain through a linking group" in the water-insoluble resin is preferably 40% by mass or more with respect to the total mass of the water-insoluble resin, from the viewpoint of the dispersion stability of the pigment, the ejection stability and the washability. The content ratio of the structural unit is preferably from 40% by mass to less than 75% by mass, more preferably from 40% by mass to less than 70% by mass, and particularly preferably from 40% by mass to less than 60% by mass.

The ratio of the aromatic ring bonded to an atom for forming the main chain through a linking group is preferably from 15% by mass to 27% by mass, more preferably from 15% by mass to 25% by mass, and particularly preferably from 15% by mass to 20% by mass with respect to the total mass of the water-insoluble resin, from the viewpoint of increasing a scratch resistance.

When the content of the aromatic ring bonded to an atom for forming the main chain through a linking group is adjusted to the above range, the scratch resistance, ink stability and ink ejection reliability can be enhanced.

Further, the hydrophobic structural unit (b) contains preferably a structural unit derived from an alkyl ester having 1-4 carbon atoms of (meth)acrylic acid from the viewpoint of the dispersion stability. The (meth)acrylic acid includes acrylic acid and methacrylic acid.

Specific examples of these alkyl esters of (meth)acrylic acids include, for example, methyl(meth)acrylate, ethyl (meth)acrylate, (iso)propyl(meth)acrylate, and (iso or tertiary) butyl(meth)acrylate. The number of carbon atoms of the alkyl moiety of the alkyl ester is from 1-4, and preferably 1-2.

The content ratio of the "structural unit derived from an alkyl ester having 1-4 carbon atoms of (meth)acrylic acid" in the water-insoluble resin is preferably 15% by mass or more with respect to the total mass of the water-insoluble resin, from the viewpoint of imparting the dispersion stability. The content ratio of the structural unit is preferably from 20% by mass to 60% by mass, and more preferably from 20% by mass to 50% by mass.

As mentioned above, from the viewpoint of further increasing the dispersion stability, the hydrophobic structural unit (b) contains preferably the structural unit having an aromatic ring bonded to an atom for forming the main chain through a linking group in an amount of 40% by mass or more (more preferably from 40% by mass to 75% by mass, further more preferably from 40% by mass to 70% by mass, particularly preferably from 40% by mass to 60% by mass) with respect to the total mass of the water-insoluble resin, and the structural unit derived from an alkyl ester having 1-4 carbon atoms of (meth)acrylic acid in an amount of 15% by mass or more (more preferably from 20% by mass to 60% by mass, particularly preferably from 20% by mass to 50% by mass) with respect to the total mass of the water-insoluble resin.

As other hydrophobic structural units (b) other than the above hydrophobic structural units, for example, the structural units derived from vinyl monomers such as (meth)acrylamides, styrenes or vinyl esters which do not belong to the hydrophilic structure (a) (for example, without having a hydrophilic functional group), and alkyl esters (1-4 carbon atoms) of (meth)acrylic acid, can be exemplified. These structural units may be used singly, or may be mixed and used.

The (meth)acrylamides include, for example, (meth)acrylamides such as N-cyclohexyl(meth)acrylamide, N-(2-methoxyethyl)(meth)acrylamide, N,N-diallyl(meth)acrylamide and N-allyl(meth)acrylamide.

The styrenes include, for example, styrene, methyl styrene, dimethyl styrene, trimethyl styrene, ethyl styrene, isopropyl styrene, n-butyl styrene, tert-butyl styrene, methoxy styrene, butoxy styrene, acetoxy styrene, chlorostyrene, dichlorostyrene, bromostyrene, and chloromethyl styrene; hydroxystyrene which is protected by a deprotectable group (for example, t-Boc. and the like) with an acidic material, vinyl methylbenzoate and α-methyl styrene, and vinyl naphthalene. Among them, styrene and α-methyl styrene are preferable The vinyl esters include, for example, vinyl esters such as vinyl acetate, vinyl chloroacetate, vinyl propionate, vinyl butylate, vinyl methoxyacetate, or vinyl benzoate. Among them, vinyl acetate is desirable.

The (meth)acrylates include, for example, methyl(meth)acrylate, ethyl(meth)acrylate, (iso)propyl(meth)acrylate, and (iso or tertiary) butyl(meth)acrylate.

With regard to the composition of the hydrophilic structural units (a) and the hydrophobic structural units (b), the content ratio of the hydrophobic structural units (b) exceeds preferably 80% by mass, and more preferably more than 85% by mass with respect to the total mass of the water-insoluble resin, although the composition varies with the degree of the hydrophilicity of the structural units (a) and the hydrophobicity of the structural units (b). In other words, the content ratio of the hydrophilic structural units (a) is preferably 15% by mass or less with respect to the total mass of the water-insoluble resin. When the content of the hydrophilic structural units (a) is 15% by mass or less, the component of independently dissolved in an aqueous liquid medium without contributing to the dispersion of the pigment decreases, so that the dispersibilty of pigment can be maintained in a good conditions, and an increase in the viscosity can be suppressed, and the ink ejecting property can be good when the composition is used for an inkjet recording ink.

The water-insoluble resin in the invention may be a random copolymer, into which each structural unit is randomly introduced, or a block copolymer, into which each structural unit is regularly introduced. When the water-insoluble resin is a block copolymer, each structural unit may be synthesized in any order of introducing the structural unit, and the water-insoluble resin may be a polymer formed by using the same structural units twice or more. The water-insoluble resin is preferably a random copolymer in view of the versatility and manufacturability.

The acid value of the water-insoluble resin of the invention is preferably 100 or less, more preferably from 30 mg KOH/g to 100 mg KOH/g, further more preferably 30 mg KOH/g to 85 mg KOH/g, and particularly preferably 50 mg KOH/g to 85 mg KOH/g, from the viewpoint of the pigment dispersibility and storability.

Here, the acid value is defined by the mass (mg) of KOH required for completely neutralizing 1 g of the water-insoluble resin, and can be measured in accordance with the method stipulated in JIS Standard (JISK0070 (1992)).

The molecular weight of the water-insoluble resin of the invention is preferably 30,000 or more by a weight average molecular weight (Mw), more preferably from 30,000 to 150,000, further more preferably from 30,000 to 100,000, and particularly preferably from 30,000 to 80,000. When the molecular weight is 30,000 or more, the steric repulsion effect as a dispersion tends to be good, and the water-insoluble resin is easily adsorbed to the pigment particles due to the steric hindrance.

Further, the number average molecular weight (Mn) is preferably in the range of from about 1,000 to about 100,000, and particularly preferably in the range of from about 3,000 to about 50,000. When the number molecular weight is within the above range, an effect as a coated layer on the pigment particles or an effect as a coated layer for ink can be exerted. The water-insoluble resin of the invention is preferably used in the form of an alkali metal salt or an organic amine salt.

Further, the molecular weight distribution (expressed by the value of weight average molecular weight/the value of number average molecular weight) of the water-insoluble resin of the invention is desirably from 1 to 6, and more desirably from 1 to 4. When the molecular weight dispersant is in the above range, the dispersion stability of ink, and the ink ejection stability can be enhanced.

The number average molecular weight and the weight average molecular weight are the molecular weights obtained in such a manner that the value detected by using a differential refractometer, by the use of a GPC analyzer, in which the columns of TSKgel GMHxL, TSKgel G4000HxL and TSKgel G2000HxL ((trade names) manufactured by Tosoh Corporation) and THF as a solvent are used, is converted with a value obtained by using polystyrene as a reference material.

The water-insoluble resin of the invention can be synthesized by various polymerization methods, for example such as a solution polymerization, a precipitation polymerization, a suspension polymerization, a bulk polymerization, or an emulsion polymerization. The polymerization reaction can be performed by operations such as a batch system, a semi-continuous system or a continuous system. The polymerization initiation methods include a method of using a radical initiator, and light or radiation irradiation method. The polymerization methods and the polymerization initiation methods are described, for example, in "Polymer Synthesis Method" revised version, written by Teiji Tsuruta (published by Nikkan Kogyo Shimbun, 1971), "Experimental Method of Polymer Synthesis" written by Takayuki Otsu and Masayoshi Kinoshita, published by Kagaku-Dojin, 1972, pp. 124-154.

Specifically, the water-insoluble resin can be manufactured in such a manner that a mixture containing a monomer mixture, and optionally containing an organic solvent and a radical polymerization initiator, is copolymerized under an inert gas atmosphere. Among the polymerization methods, the solution polymerization method using a radical initiator is particularly desirable.

The solvents used in the solution polymerization method include, for example, various organic solvents such as ethyl acetate, butyl acetate, acetone, methyl ethylketone, methyl isobutylketone, cyclohexanone, tetrahydrofuran, dioxane, N,N-dimethyl formamide, N,N-dimethyl acetamide, benzene, toluene, acetonitrile, methylene chloride, chloroform, dichloroethane, methanol, ethanol, 1-propanol, 2-propanol or 1-butanol. These organic solvents may be used singly, or may be used as a mixture of two or more kinds of solvents, or as a mixed solvent with water. It is necessary to set the polymerization temperature in relation to the molecular weight of the polymer to be formed, and the kind of the initiator. In general, although the polymerization temperature is about 0° C. to about 100° C., it is desirable to perform polymerization at a temperature in the range of from 50° C. to 100° C. The reaction pressure can be suitably selected, and is usually about 1 kg/cm$^2$ to 100 kg/cm$^2$, but is preferably about 1 kg/cm$^2$ to 30 kg/cm$^2$. The reaction time is about 5 to 30 hours. The obtained resin may be purified through reprecipitation or the like.

Preferable examples of the water-insoluble resins of the invention are shown below. However, the present invention is not limited thereto.

$$-(CH_2-\underset{COO-CH_2-\phantom{|}\phantom{|}\phantom{|}}{\overset{R^{11}}{\underset{|}{C}}})_a- \quad -(CH_2-\underset{COOH}{\overset{R^{21}}{\underset{|}{C}}})_b- \quad -(CH_2-\underset{COO-R^{32}}{\overset{R^{31}}{\underset{|}{C}}})_c-$$

|  | R$^{11}$ | R$^{21}$ | R$^{31}$ | R$^{32}$ | a | b | c | Mw |
|---|---|---|---|---|---|---|---|---|
| B-1 | CH$_3$ | CH$_3$ | CH$_3$ | —CH$_3$ | 60 | 10 | 30 | 46000 |
| B-2 | H | H | H | —CH$_3$ | 60 | 10 | 30 | 50000 |

-continued

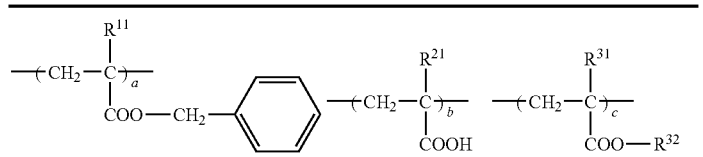

| | $R^{11}$ | $R^{21}$ | $R^{31}$ | $R^{32}$ | a | b | c | Mw |
|---|---|---|---|---|---|---|---|---|
| B-3 | $CH_3$ | $CH_3$ | $CH_3$ | $-CH_2CH_3$ | 61 | 10 | 29 | 43000 |
| B-4 | $CH_3$ | $CH_3$ | $CH_3$ | $-CH_2CH_2CH_2CH_3$ | 61 | 9 | 30 | 51000 |
| B-5 | $CH_3$ | $CH_3$ | $CH_3$ | $-CH_2(CH_3)CH_3$ | 60 | 9 | 31 | 96000 |
| B-6 | H | H | H | $-CH_2(CH_3)(CH_3)CH_3$ | 60 | 10 | 30 | 32000 |
| B-7 | $CH_3$ | $CH_3$ | $CH_3$ | $-CH_2CH(CH_3)CH_3$ | 60 | 5 | 30 | 75000 |

(a, b and c each represent the composition (% by mass))

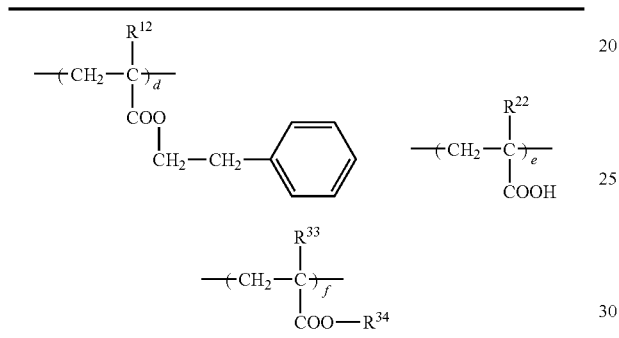

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | $-CH_3$ | 55 | 12 | 33 | 31000 |
| B-9 | H | H | H | $-CH_2CH(CH_3)CH_3$ | 70 | 10 | 20 | 34600 |

(d, e and f each represent the composition (% by mass))

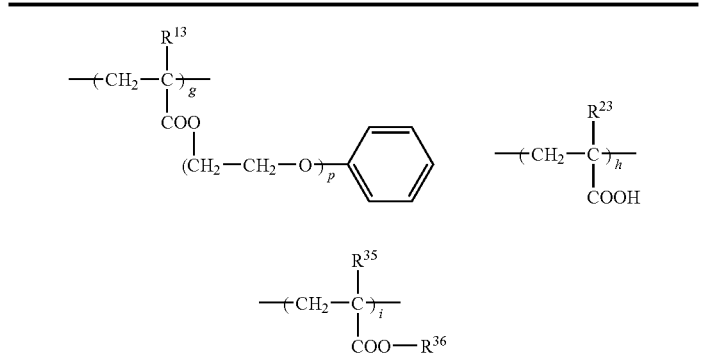

| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | $-CH_3$ | 60 | 9 | 31 | 35500 |
| B-11 | H | 1 | H | H | $-CH_2CH_3$ | 69 | 10 | 21 | 41200 |
| B-12 | $CH_3$ | 2 | $CH_3$ | $CH_3$ | $-CH_3$ | 70 | 11 | 19 | 68000 |
| B-13 | $CH_3$ | 4 | $CH_3$ | $CH_3$ | $-CH_2(CH_3)CH_3$ | 70 | 7 | 23 | 72000 |
| B-14 | H | 5 | H | H | $-CH_3$ | 70 | 10 | 20 | 86000 |
| B-15 | H | 5 | H | H | $-CH_2CH(CH_3)CH_3$ | 70 | 2 | 28 | 42000 |

(g, h and i each represent the composition (% by mass))

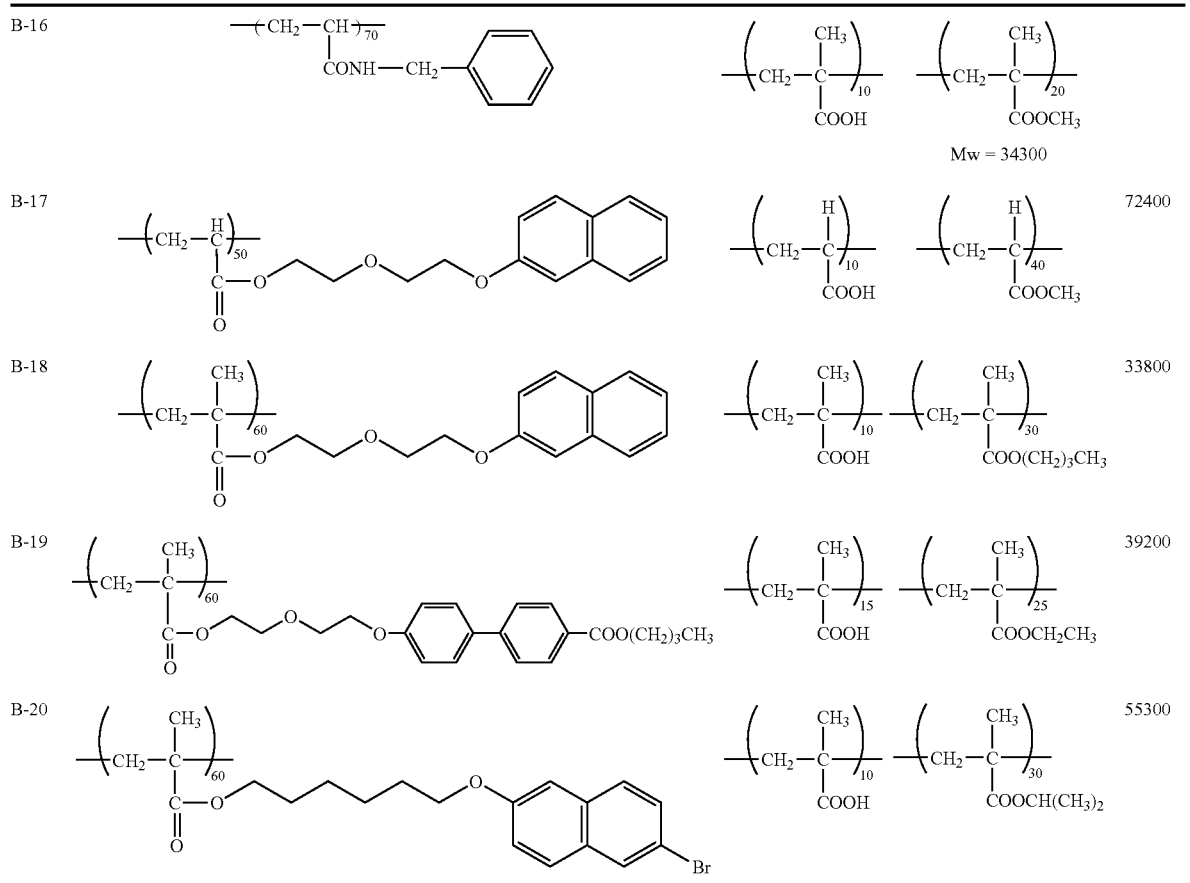

(Pigment Dispersion)

Although the method of manufacturing the "pigment particles covered with water-insoluble resin" in the invention is not particularly restricted, for example, the pigment dispersion can be manufactured by dispersing pigment using a water-insoluble resin as a dispersant.

In such a way, pigment particles with a microparticulated size can be formed, and a high dispersion stability after dispersion can be attained. In this case, the entire surface of the pigment particles is not necessarily covered with the water-insoluble resin, but at least a part of the pigment particles may be covered with the water-insoluble resin, as occasion demands.

The pigment dispersion can be manufactured, for example, using the phase-inversion emulsifying method as described in the above. More specifically, after mixing the pigment, the water-insoluble resin as a dispersant, water, and a water-insoluble volatile solvent and dispersed, the water-insoluble volatile solvent is removed from the resultant dispersion. At this time, a part or all of the anionic groups of the water-insoluble resin may be neutralized by adding a basic compound. An excellent dispersibility can be attained by controlling the neutralization. As an example of the basic compound, sodium hydroxide is exemplified. Further, at this time, an alkyleneoxide adduct of glycerin, which will be described later, may be added together with the he water-insoluble volatile solvent.

The dispersion can be performed using known methods of agitating and dispersing after mixing desired components, or using known agitating and dispersing machines. The dispersion can be performed, for example, by using a ball mill, a roll mill, a bead mill, a high-pressure homogenizer, a high-speed agitating dispersion machine and a ultrasonic homogenizer.

—Dispersant for Pigment—

At the time of manufacturing the pigment dispersion, the water-insoluble resin can be used as a dispersant. At this time, the other dispersant for pigment in addition to the water-insoluble resin may be used together.

The other dispersant for the pigment can be appropriately selected from the compounds having a function for dispersing pigment in an aqueous phase. Examples of dispersants for pigment include a nonionic compound, an anionic compound, a cationic compound and amphoteric compound.

For example, as dispersants, homopolymers or copolymers of monomers having an α,β-ethylenic unsaturated group and the like are exemplified. Examples of the monomers having an α,β-ethylenic unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as α-methyl styrene, vinyltoluene; vinyl cyclohexane, vinyl naphthalene, vinyl naphthalene derivatives, an alkyl acrylate which may have an aromatic substituent group, a phenyl acrylate, an alkyl methacrylate which may have an aromatic substituent group, a phenyl methacrylate, a cycloalkyl methacrylate, an alkyl crotonate, a dialkyl itaconate, a dialkyl maleate, vinyl alcohol, and derivatives of the above compounds.

Homopolymers or copolymers of monomers having the $\alpha,\beta$-ethylenic unsaturated group, may be used as a polymer dispersant.

The polymer dispersants include an alkyl acrylate-acrylic acid copolymer, an alkyl methacrylate-methacrylic acid copolymer, a styrene-alkyl acrylate-acrylic acid copolymer, styrene-phenylmethacrylate-methacrylic acid copolymer, styrene-cyclohexyl methacrylate-methacrylic acid copolymer, styrene-styrene sulfonic acid copolymer, styrene-maleic acid copolymer, styrene-methacrylic acid copolymer, styrene-acrylic acid copolymer, vinyl naphthalene-maleic acid copolymer, vinyl naphthalene-methacrylic acid copolymer, vinyl naphthalene-acrylic acid copolymer, polystyrene, polyester and polyvinyl alcohol.

—Water-Insoluble Volatile Solvent—

When the pigment dispersion is prepared, at least one kind of water-insoluble volatile solvents may be used. Since the water-insoluble volatile solvent has less influence on the dispersibility, the water-insoluble volatile solvent can be removed finally, while maintaining a good dispersibility in the dispersion step, so that the dispersion can be thickened while maintaining a good dispersed state, and the pigment dispersion with an excellent storability over a long period of time can be obtained. Moreover, when an ink composition is prepared and used for recording, an image recording with a high ink ejection stability and suppressed curl of a recording medium can be attained.

The term "water-insolubility" refers to the characteristic such that when a solvent is mixed with pure water in the same amount of the solvent, and the mixture is gently stirred at one atmospheric pressure and 20° C., the mixture does not appear to be homogeneous, even after the flow due to stirring is ceased. The solubility in water is desirable in 80 g/100 ml or less, and 50 g/100 ml is more desirable at 20° C.

The "volatility" of a solvent means that the solvent has a boiling point of 200° C. or less, and desirably 150° C. or less.

The water-insoluble volatile solvent may be appropriately selected from organic solvents with water-insolubility and volatility. Examples of the water-insoluble volatile solvents include ketone-based solvents (for example, methylethyl ketone, diethyl ketone and the like), and ether-based solvents (for example, dibutyl ether and the like). In particular, from the viewpoint of the dispersion stability, ketone-based solvents are preferable, and methylethyl ketone is particularly preferable The use amount of the water-insoluble volatile solvent is preferably from 10% by mass to 1,000% by mass, more preferably from 50% by mass to 800% by mass, and still more preferably from 100% by mass to 500% by mass with respect to the use amount of the alkyleneoxide adduct of glycerin, in view of good dispersibility and stability of dispersion after dispersion, and the ink ejection stability when the water-insoluble volatile solvent is used for an ink composition for recording, and suppression of curl of a recorded medium.

The water-insoluble volatile solvent as described in the above is preferably removed from the liquid after the pigment is dispersed. In such a way, the amount of the water-insoluble volatile solvent which becomes unnecessary finally is reduced, and a thickened pigment dispersion can be obtained, while the dispersibility of pigment and storability of the dispersion can be maintained over a long period of time. Further, when the water-insoluble volatile solvent is used for preparation of pigment ink, and the ink is used for recording an image, the ink ejection stability can be attained, and occurrence of curl of a recording medium can be prevented.

The removal of the water-insoluble volatile solvent can be performed by conventional methods including a drying method such as heating or air blowing, or distillation under reduced pressure, and the water-insoluble volatile solvent is distilled away from the dispersion obtained by the dispersion process, so that the dispersion is thickened and phase-inverted to an aqueous system. In this case, when the water-insoluble resin is used as a dispersant for pigment, a dispersion of pigment particles, in which the surface of the pigment particles is covered with the water-insoluble resin, can be obtained.

It is preferable that the water-insoluble volatile solvent is substantially removed from the pigment dispersion to be prepared by the removal process of the water-insoluble volatile solvent, but the remaining amount of the water-insoluble volatile solvent in the pigment dispersion is preferably 5% by mass or less relative to the addition amount of the water-insoluble volatile solvent at the time of dispersing, from the viewpoint of the thickening of the pigment dispersion, the ejection stability when an ink composition using the water-insoluble volatile solvent is used, and the suppression of occurrence of curl of a recording medium. The remaining amount of the water-insoluble volatile solvent in the pigment dispersion is preferably 1% by mass or less, and more preferably 0.1% by mass or less.

The average particle diameter of pigment particles dispersed in the pigment dispersion is preferably in the range of from 30 nm to 200 nm, and more preferably in the range of from 50 nm to 150 nm. When the average particle diameter of pigment particles is 30 nm or more, the production suitability is improved, and when the average particle diameter of pigment particles is 200 nm or less, the storability of the dispersion becomes good. The size distribution of the pigment particles covered with resin is not specifically restricted, and both particles with a wide particle distribution and the particles with mono-disperse particle distribution may be used.

Further, the average particle diameter and of the particle size distribution of pigment particles can be obtained by measuring the volume average particle diameter by a dynamic light scattering method using NANOTRAC particle size distribution measuring device UPA-EX150 ((trade name) manufactured by Nikkiso Co., Ltd.).

The "pigment covered with water-insoluble resin" in the invention is explained hereinbefore.

Although the content of the "pigment covered with water-insoluble resin" in the ink composition of the invention is not specifically restricted, the content is preferably from 0.05% by mass to 30% by mass, more preferably from 0.1% by mass to 20% by mass, and particularly preferably from 0.15% by mass to 15% by mass. When the content is 0.05% by mass or more, the phenomena that ink coloration becomes insufficient can be effectively prevented. Further, when the content is 30% by mass or less, an increase in the viscosity of ink can be effectively suppressed and deterioration of the ink ejection stability and the like can be effectively prevented.

<Resin Particles>

The ink composition of the invention contains at least one kind of resin particles.

The ink composition of the invention contains the resin particles, so that the fixability of the ink composition to a recording medium is increased, and the scratch resistance can be improved.

The resin particles of the invention are used preferably as a resin particle dispersion (latex) in which the resin particles are dispersed.

The resin particles in the invention include, for example, particles such as an acrylate-based resin, a vinyl acetate-based resin, a styrene-butadiene-based resin, a vinylchloride-based resin, an acrylate-styrene-based resin, a butadiene-based resin, a styrene-based resin, a crosslinked acrylate resin, a crosslinked styrene-based resin, a benzoguanamine resin, a phenol resin, a silicone resin, an epoxy resin, a urethane-based resin, a paraffin-based resin or a fluorine-based resin. In particular, the particles of an acrylate-based resin, an acrylate-styrene-based resin, a styrene-based resin, a crosslinked acrylate-based resin, and a crosslinked styrene-based resin are desirable.

From the viewpoint of the stability of an ink composition, the weight average molecular weight of the resin particles in the invention is preferably from 10,000 to 200,000, and more preferably from 100,000 to 200,000.

The average particle diameter of the resin particles is preferably from 10 nm to 1 μm, more preferably from 10 nm to 200 nm, further more preferably from 20 nm to 100 nm and particularly preferably from 20 nm to 50 nm.

From the viewpoint of the preservation stability of the ink composition, the glass transition temperature Tg of the resin particles in the invention is preferably 30° C. or more, more preferably 40° C. or more, and further more preferably 50° C. or more.

Moreover, the particle size distribution of the latex containing resin particles of the invention is not specifically restricted. Both the latex with a broad particle size distribution and the latex with a monodispersed particle size distribution may be used. Moreover, two or more kinds of latexes with monodispersed particle size distributions may be used by mixing thereof.

The content of the resin particles in the ink composition of the invention (in the case that plural kinds of particles are contained, the sum of the contents thereof) is preferably 5% by mass or more with respect to the total mass of the ink composition, more preferably from 5% by mass to 20% by mass, and still more preferably 5% by mass to 15% by mass, from the viewpoint of further enhancing the fixability of the ink composition to a recording medium.

In view of the performance (glossiness and abrasion resistance) of an image after fixation, the mass ratio of the total amount of the water-insoluble resin and the pigment to the content of the resin particles (the total amount of the water-insoluble resin and the pigment/the content of the resin particles) is preferably 2.0 or less, more preferably 1.5 or less, and further more preferably 1.0 or less.

<Solid Wetting Agent>

The ink composition of the invention contains a solid wetting agent in an amount of 5% by mass or more.

Here, when two or more kinds of the solid wetting agents are contained in the ink composition of the invention, the total amount of the two or more kinds of the solid wetting agents is 5% by mass or more with respect to the total mass of the ink composition.

When the content of the solid wetting agent is less than 5% by mass, the wiping-off property becomes worse.

The solid wetting agent in the invention refers to a water-soluble compound that is water-retentive, and solid at 25° C.

As the solid wetting agent usable in the invention, compounds commonly used for aqueous ink compositions can be used in situ, and, more specifically, saccharides, polyhydric alcohols such as sugar alcohols, hyaluronic acids, trimethylol propane or 1,2,6-hexanetriol, urea, and urea derivatives are exemplified.

Examples of the urea derivatives include compounds in which the hydrogen atom on the nitrogen of urea is substituted with an alkyl group or an alkanol, thiourea, or compounds in which the hydrogen atom on the nitrogen of thiourea is substituted with an alkyl group or an alkanol. More specifically, N,N-dimethyl urea, thiourea, ethyleneurea, hydroxyethyl urea, hydroxybutyl urea, ethylene thiourea, diethyl thiourea, and the like are exemplified.

Examples of the saccharides include monosaccharides, disaccharide, oligosaccharides (including trisaccharides and tetraaccharides) and polysaccharides, specifically, glucose, mannose, fructose, ribose, xylose, arabinose, galactose, aldonic acid, glucitol, (sorbit), maltose, cellobiose, lactose, sucrose, trehalose, maltotriose are exemplified. Here, polysaccharides means saccharides in a broad sense, and, are used for including substances such as alginic acid, α-cyclodextrin, or cellulose, which are widely distributed in nature. Further, derivatives of these saccharides include reducing sugars (for example, sugar alcohol), and sugar acids (for example, aldonic acid, uronic acid, amino acid, thiosugar, and the like). In particular, sugar alcohol is desirable, and specifically, maltitol, sorbitol, xylitol, and the like are exemplified. As hyaluronate, commercially available sodium hyaluronate (1% aqueous solution) (molecular weight 350,000) may be used.

In particular, urea and urea derivatives have a high moisture-retaining property, and can be suitably used as a solid wetting agent of the invention.

Although the content of the solid wetting agent in the ink composition of the invention is 5% by mass or more, the content is preferably from 5% by mass to 30% by mass, and more preferably from 5% by mass to 20% by mass, from the viewpoint of further increasing the wiping off property.

The combination of the content of the solid wetting agent in the ink composition of the invention and the content of the resin particles in the ink composition of the invention is not specifically restricted, but, from the viewpoint that the wiping-off property is more effectively compatible with the image fixability, the following combinations are desirable.

That is, the combination, in which the content of the solid wetting agent is 5% by mass or more and the content of the resin particles is 5% by mass or more, is preferable, the combination, in which the content of the solid wetting agent is from 5% by mass to 20% by mass and the content of the resin particles is from 5% by mass to 20% by mass is more preferable, and the combination, in which the content of the solid wetting agent is from 5% by mass to 10% by mass and the content of the resin particles is from 5% by mass to 10% by mass is particularly preferable.

Moreover, the ratio of the content of the solid wetting agent to the total amount of the solid content (the sum of the water-insoluble resin, the pigment and the resin particles) in the ink composition (the mass of the solid wetting agent/the mass of the total solid content) is preferably 0.3 or more, more preferably from 0.4 to 2.0, and further more preferably from 0.5 to 1.5.

<Water-Soluble Organic Solvent>

The ink composition of the invention contains at least one kind of water-soluble organic solvents.

Here, the "water-soluble organic solvent" in the invention means an organic solvent which can dissolve by 5 g or more in 100 g of water.

Examples of the water-soluble organic solvents include glycerin, 1,2,6-hexanetriol, trimethylol propane, alkanediols (polyhydric alcohols) such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1, 2-pentanediol; saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; so-called solid wetting agents such as ureas; alkyl alcohols having 1-4 carbon atoms, such as ethanol, methanol, butanol, propanol or isopropanol; glycol ethers such as ethyleneglycol monomethylether, ethyleneglycol monoethylether, ethyleneglycol monobutylether, ethyleneglycol monomethylether acetate, diethyleneglycol monomethylether, diethyleneglycol monoethylether, diethylene glycol mono-n-propylether, ethyleneglycol mono-iso-propylether, diethylene glycol mono-iso-propylether, ethyleneglycol mono-n-butylether, ethyleneglycol mono-t-butylether, diethyleneglycol mono-t-butylether, 1-methyl-1-methoxybutanol, propyleneglycol monomethylether, propyleneglycol monoethylether, propyleneglycol mono-t-butylether, propyleneglycol mono-n-propylether, propyleneglycol mono-iso-propylether, dipropyleneglycol monomethylether, dipropyleneglycol monoethylether, dipropyleneglycol mono-n-propylether or dipropyleneglycol mono-iso-propylether; 2-pyrrolidone, N-methyl-2-pyrrolidone, 1,3-dimethyl-2-imidazolizinone, formamide, acetamide, dimethylsulfoxide, sorbit, sorbitan, acetin, diacetin, triacetin or sulfolane. These compounds may be used singly, or may be used in combination two or more kinds thereof together.

For the purpose of imparting a dryness preventive property or a wetting property, it is useful to use polyhydric alcohols. Examples of polyhydric alcohols include glycerin, ethylene glycol, diethylene glycol, triethylene glycol, propylene glycol, dipropylene glycol, tripropylene glycol, 1,3-butanediol, 2, 3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. These compounds may be used singly or may be used in combination of two or more kinds thereof. In view of penetrating property, it is desirable to use polyol compounds. Examples of polyol compounds include, for example, aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol or 2-ethyl 1,3-hexanediol. In particular, 2-ethyl-1,3-hexanediol and 2,2,4-trimethyl-1,3-pentanediol are preferable. These compounds may be used singly or may be used in combination of two or more kinds thereof.

From the viewpoint of imparting the dryness preventive property and the wetting property, the content of the water-soluble organic solvent contained in the ink composition of the invention is preferably from 1.0% by mass to 50% by mass, more preferably from 5.0% by mass to 40% by mass, and particularly preferably from 10% by mass to 30% by mass.

From the viewpoint of suppressing the curl of a recording medium when an image is recorded on the recording medium, the water-soluble organic solvent contained in the ink composition of the invention contains preferably at least one kind of water-soluble solvents having an SP value of 27.5 or less.

Further, form the viewpoint of further suppressing the curl of the recording medium, 80% by mass or more of the total amount of the water-soluble organic solvents is preferably a water-soluble-inorganic solvent having an SP value of 27.5 or less. In other words, the content of the water-soluble organic solvent having an SP value of 27.5 or less (when two or more kinds of water-soluble organic solvents having an SP value of 27.5 or less is contained, the total contents thereof) is preferably 80% by mass or more with respect to the total amount of the water-soluble organic solvent contained in the ink composition of the invention.

In general, in the combination of the water-soluble organic solvent having an SP value of 27.5 or less with a pigment dispersion in which a known surfactant or a water-soluble polymer as a dispersant is contained, when the content of the water-soluble organic solvent having an SP value of 27.5 or less increases, the dispersion becomes unstable, and a problem of ink instability arises due to the acceleration of the release of the dispersant adsorbed to the surface of the pigment particles. In the invention, with the use of pigment particles covered with the water-insoluble resin, the suppression of the curl of the recording medium can be compatible with the ink stability.

The SP value in the invention refers to the solubility parameter. In more detail, the SP value is a value expressed by the square root of the molecule cohesive energy. The numerical value of the Sp value can be calculated by the method described in R. F. Fedors, Polymer Engineering Science, 14, pp 147-154 (1974), and in the invention, the numerical values calculated by this method are used.

The description recited in R. F. Fedors, Polymer Engineering Science, 14, pp 147-154 (1974) are herein incorporated by reference.

Examples of the water-soluble organic solvent having an SP value of 27.5 or less are shown below:

diethyleneglycol monoethylether (22.4);

diethyleneglycol monobutylether (21.5);

triethyleneglycol monobutylether (21.1);

dipropyleneglycol monomethylether (21.3); and dipropyleneglycol (27.2).

$nC_4H_9O(AO)_4$—H (AO=EO or PO, and the ratio of EO:PO=1:1) (20.1);

$nC_4H_9O(AO)_{10}$—H (AO=EO or PO, and the ratio of EO:PO=1:1) (18.8);

$HO(A'O)_{40}$—H (A'O=EO or PO, and the ratio of EO:PO=1:3) (18.7);

$HO(A''O)_{55}$—H (A''O=EO or PO, and the ratio of EO:PO=5:6) (18.8);

$HO(PO)_3$—H (24.7);

$HO(PO)_7$—H (21.2); and 1,2-hexanediol (27.4).

In the invention, EO and PO represent an ethyleneoxy group and a propyleneoxy group, respectively.

Moreover, among alkyleneoxide adducts of glycerin, which will be described hereinafter, compounds within the scope of the water-soluble organic solvent having an SP value of 27.5 or less are included, and these compounds are also desirable.

The water-soluble organic solvent contained in the ink composition of the invention contains preferably at least one kind of alkyleneoxide adducts of glycerin. When the water-soluble organic solvent contains the alkyleneoxide adduct of glycerin, the dispersibility and the storability over a long period of time after forming a dispersion can be further improved, and the ink ejection stability when the water-soluble organic solvent is used in an ink composition can be further improved.

The alkyleneoxide adduct of glycerin is preferably a compound represented by the formula (1);

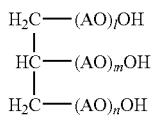

Formula (1)

In the formula (1), l, m and n each independently represent an integer of 1 or more, and the relationship of $3 \leq l+m+n \leq 15$ is satisfied.

When the value of l+m+n is 3 or more, the curl preventive ability for a recording medium becomes good, and when the value of l+m+n is 15 or less, the ink ejecting property becomes good.

In particular, the value of l+m+n is preferably from 3 to 12, and more preferably from 3 to 10.

In the formula (1), AO represents an ethyleneoxy group and/or a propyleneoxy group, and, in particular, propyleneoxy group is preferable.

The AO in the above $(AO)_l$, $(AO)_m$ and $(AO)_n$ in the formula (1) may be the same respectively, or may be different from one another.

Examples of the compounds represented by the formula (1) are shown hereinafter. However, the invention is not restricted thereto.

In addition, the numerical values in the parenthesis express the SP values.

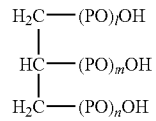

l + m + n = 3 (26.4)
PO = propyleneoxy

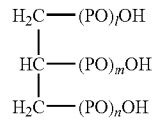

l + m + n = 5 (23.9)
PO = propyleneoxy

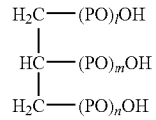

l + m + n = 7 (22.6)
PO = propyleneoxy

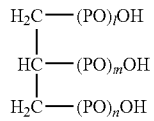

l + m + n = 4 (24.9)
PO = propyleneoxy

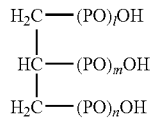

l + m + n = 6 (23.2)
PO = propyleneoxy

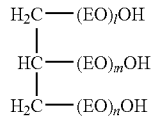

l + m + n = 6 (25.6)
EO = ethyleneoxy

As the alkyleneoxide adducts of glycerin, commercially available products may be used. In the commercial products, as polyoxypropylated glycerin (ether of polypropylene glycol and glycerin), for example, SUNNIX GP-250 (average molecular weight of 250), GP-400 (average molecular weight of 400), and GP-600 (average molecular weight of 600) (trade names) manufactured by Sanyo Chemical Industries, Ltd.; LEOCON GP-250 (average molecular weight of 250), GP-300 (the average molecular weight of 300), GP-400 (average molecular weight of 400), and GP-700 (average molecular weight of 700) (trade names) manufactured by Lion Corporation; and polypropylene triol glycol triol type (average molecular weights of 300 and 700) manufactured by Wako Pure Chemical Industries, Ltd. are exemplified.

<Water>

Although the pigment dispersion in the invention contains water, the quantity of water is not particularly restricted. In particular, the content of water is preferably from 10% by mass to 99% by mass, more preferably from 30% by mass to 80% by mass, and still more preferably from 50% by mass to 70% by mass.

<Other Components>

The ink composition of the invention may contain other additives in addition to the above components. The other additives include, for example, known additives such as a surfactant, an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

The surfactant is used as a surface tension adjusting agent, and includes a nonionic surfactant, a cationic surfactant, an anionic surfactant and a betaine surfactant. In order to impinge inkjet droplets suitably on a recording medium, the surface tension adjusting agent is added to an ink composition in such an amount that the surface tension of the ink composition of the invention is preferably adjusted to 20 mN/m-60 mN/m, more preferably adjusted to 20 mN/m-45 mN/m, and still more preferably 25 mN/m to 40 mN/m.

As the surfactant, a compound having a structure of a hydrophilic moiety and a hydrophobic moiety in a molecule can be effectively used. Any of an anionic surfactant, a cationic surfactant, an amphoteric surfactant, and a nonionic surfactant can be used.

Examples of anionic surfactants include, for example, sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctyl sulfosuccinate, a sodium polyoxyethylene alkylether sulfate, a sodium polyoxyethylene alkylphenylether sulfate, sodium oleate, and sodium t-octylphenoxyethoxy polyethoxyethyl sulfate. These surfactants may be used singly, or may be used in combination of two or more kinds thereof.

Examples of nonionic surfactants include, for example, polyoxyethylene lauryl ether, polyoxyethylene octylphenyl ether, polyoxyethylene oleyl phenylether, polyoxyethylene nonyl phenylether, oxyethylene-oxypropylene block copolymer, t-octylphenoxyethyl polyethoxyethanol and nonylphenoxyethyl polyethoxyethanol. These surfactants may be used singly, or may be used in combination of two or more kinds thereof.

Examples of cationic surfactants include a tetraalkyl ammonium salt, an alkylamine salt, a benzalkonium salt, an alkylprydinium salt and an imidazolium salt. More specifically, for example, dihydroxyethyl stearylamine, 2-heptadecenyl-hydroxyethyl imidazoline, lauryldimethyl benzyl ammonium chloride, cetyl pyridinium chloride, and stearamide methylpyridinium chloride are exemplified.

Although the content of the surfactant in the ink composition is not specifically restricted, the content is preferably 1% by mass or more, more preferably from 1% by mass to 10% by mass, and further more preferably from 1% by mass to 3% by mass.

Examples of ultraviolet absorbers include, for example, a benzophenone-based ultraviolet absorber, a benzotriazole-based ultraviolet absorber, a salicylate-based ultraviolet absorber, a cyanoacrylate-based ultraviolet absorber and a nickel complex salt-based ultraviolet absorber.

As anti-fading agents, various kinds of organic and metal complex-based anti-fading agents can be used. The organic anti-fading agents include hydroquinones, alkoxyphenols, dialkoxyphenols, phenols, anilines, amines, indans, chromanes, alkoxy anilines and heterocycles. As the metal complexes, a nickel complex and a zinc complex are exemplified.

Examples of the antifungal agents include sodium dehydroacetate, sodium benzoate, sodium pyridinethione-1-oxide, ethyl-p-hydroxybenzoate, 1,2-benzisothiazoline-3-on, sodium sorbate and sodium pentachlorophenol. These antifungal agents are desirably added to ink in an amount of from 0.02% by mass to 1.00% by mass.

The pH adjusters are not specifically restricted as long as the pH adjuster can adjust a pH value to a desired value without exerting an adverse influence on a recording ink to be prepared. The pH adjuster may be appropriately selected in accordance with the intended use. Examples of the pH adjusters include, for example, alcohol amines (for example, diethanol amine, triethanol amine, 2-amino-2-ethyl-1,3-propanediol and the like), alkali metal hydroxides (for example, lithium hydroxide, sodium hydroxide, potassium hydroxide and the like), ammonium hydroxides (for example, ammonium hydroxide, quaternary ammonium hydroxide), phosphonium hydroxides and alkali metal carbonates.

Examples of the antirust agents include, for example, acid sulfite, sodium thiosulfate, ammonium thiodiglycolate, diisopropyl ammonium nitrite, pentaerythritol tetranitrate and dicyclohexyl ammonium nitrite.

Examples of the antioxidants include, for example, phenolic antioxidants (including hindered phenol-based antioxidants), amine-based antioxidants, sulfur-based antioxidants and phosphorus-based antioxidants.

Examples of the chelating agents include, for example, sodium ethylenediamine tetraacetate, sodium nitrilotriacetate, sodium hydroxyethyl ethylenediamine triacetate, sodium diethylenetriamine pentaacetate and sodium uramil diacetate.

<Physical Properties of Ink Composition>

The surface tension of the ink composition of the invention is desirably from 20 mN/m to 60 mN/m from the viewpoint of the ink ejecting stability when the ink composition is used for the inkjet recording method. The surface tension is more preferably from 20 mN/m to 45 mN/m, and still more preferably from 25 mN/m to 40 mN/m.

The viscosity at 20° C. of the ink composition of the invention is preferably from 1.2 mPa·s to 15.0 mPa·s, more preferably from 2 mPa·s to less than 13 mPa·s and still more preferably from 2.5 mPa·s to less than 10 mPa·s.

Further, the ink composition can be used for forming a multicolor image (for example, a full color image). In order to form a full color image, by changing the color hue of pigment used for an ink composition, a magenta color tone ink, a cyan color tone ink, and a yellow color tone ink may be used. Further, in order to control a color tone, a black color tone ink may be optionally used. Moreover, in the ink composition of the invention, a red (R) ink, a green (G) ink, a blue (B) ink, or a white (W) ink, or a so-called special ink in the printing field, other than yellow (Y), magenta (M), and cyan (C) tone inks may be used.

—Image Recording Method—

The image recording method of the present invention is constituted by including an ink applying process that applies the ink composition of the invention onto a recording medium by use of an inkjet method.

In the image recording method of the invention, the ink composition of the invention has an excellent dispersion stability, fixability of the ink composition to a recording medium, and wiping-off property at the time of the ink composition being dried and solidified, so that the image recording method of the invention is excellent in the fixability of an image to a recording medium, the adhesiveness of an image to the recording medium after fixing, and the abrasion resistance.

Moreover, when a water-soluble organic solvent with an SP value of 27.5 or less is contained in the ink composition in an amount of 80% by mass or more, the curl of the recording medium is suppressed.

In the inkjet recording method by applying an ink composition to a recording medium by use of the inkjet method, for example, energy is applied to the inkjet recording ink (ink composition) to form an image on known image receiving materials, namely, plain paper, resin coated paper, special inkjet recording paper as described in JP-A-Nos. 8-169172, 8-27693, 2-276670, 7-276789, 9-323475, 62-238783, 10-153989, 10-217473, 10-235995, 10-217597 and 10-337947, film, electrophotographic common paper, fabrics, glass, metal and ceramics. In addition, as the inkjet recording method applicable to the invention, the inkjet recording method described in the paragraph numbers from [0093] to [0105] of JP-A No. 2003-306623 is desirable.

When forming an image, a polymer latex compound may be used together for the purpose of imparting the glossiness and water resisting property or improving weather-resistance. The time when the latex compound is applied to the image receiving material may be prior to applying a colorant, or after the colorant is applied, even at the same time of applying the colorant. Accordingly, the latex compound may be added to an image receiving paper or added to an ink, or may be used as an independent liquid form of a polymer latex. More specifically, methods described in JP-A No. 2002-166638 (Patent Application No. 2000-363090), JP-A No. 2002-121440 (Patent Application No. 2000-315231), JP-A No. 2002-154201 (Patent Application No. 2000-354380), JP-A No. 2002-144696 (Patent Application No. 2000-343944) and JP-A No. 2002-080759 (Patent Application No. 2000-268952) can be preferably used.

A preferred example of an image forming method according to the present invention, includes:

a first process of applying an ink composition to a recording medium (ink applying process); and a second process of fixing by at least heating the ink composition that has been applied to the recording medium (fixing process).

Other processes may be included in the image forming method. As another processes, a drying and removal process or the like can be selected as appropriate in accordance with the intended use.

The heating and fixing process is not particularly restricted as long as latex particles contained in the ink used in the inkjet recording method are fused and fixed by the process, and the process can be selected as appropriate in accordance with the intended use.

The drying and removal process is not particularly restricted as long as the solvent for the ink in the ink composition that has been applied to a recording medium can be dried and removed, and the process can be selected as appropriate according to the purpose.

The recording medium in the invention is not particularly restricted and examples include plain paper, high quality paper, and coated paper.

The recorded product by the use of the ink composition or ink set of the invention can be an image recorded product with a suppressed curl of a recording medium.

The exemplary embodiments of the invention are as follows:

<1> An ink composition comprising pigment particles covered with a water-insoluble resin, resin particles, a water-soluble organic solvent, water, and a solid wetting agent in an amount of 5% by mass or more.

<2> The ink composition according to <1>, wherein the solid wetting agent is at least one wetting agents selected from urea or urea derivatives.

<3> The ink composition according to <1> or <2>, wherein the resin particles are contained in an amount of 5% by mass or more with respect to the total mass of the ink composition.

<4> The ink composition according to any one of <1>-<3>, wherein the pigment particles are covered with the water-insoluble resin by a phase-inversion emulsifying method.

<5> The ink composition according to any one of <1>-<4>, wherein the water-insoluble resin has a hydrophobic structural unit and a hydrophilic structural unit, and the hydrophobic structural unit comprises a first structural unit having an aromatic ring bonded to an atom forming the main chain of the structural unit in an amount of 40% by mass or more with respect to the total mass of the water-insoluble resin, and a second structural unit derived from an alkyl ester having 1-4 carbon atoms of (meth)acrylic acid in an amount of 15% by mass or more with respect to the total mass of the water-insoluble resin, and, the hydrophilic structural unit comprises a third structural unit derived from (meth)acrylic acid in an amount of 15% by mass or less with respect to the total mass of the water-insoluble resin.

<6> The ink composition according to any one of <1>-<5>, wherein 80% by mass or more of the total mass of the water-soluble organic solvent is a water-soluble organic solvent having an SP value of 27.5 or less.

<7> An image recording method including applying the ink composition according any one of <1>-<6> to a recording medium by an inkjet method.

<8> The image recording method according to <7>, wherein the method further comprises fixing the ink composition applied to the recording medium by at least heating.

EXAMPLES

Hereinafter, the present invention will be described in more detail with reference to the examples, but the invention is not limited to the examples. Further, "parts" and "%" are expressed in terms of mass, unless otherwise specified.

<Synthesis of Resin Dispersant (Water-Insoluble Resin)>

Synthetic Example 1

The resin dispersant was synthesized according to the following scheme.

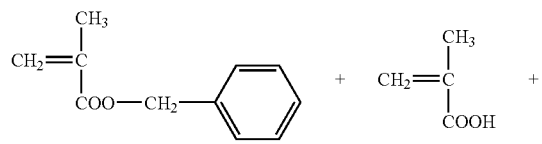

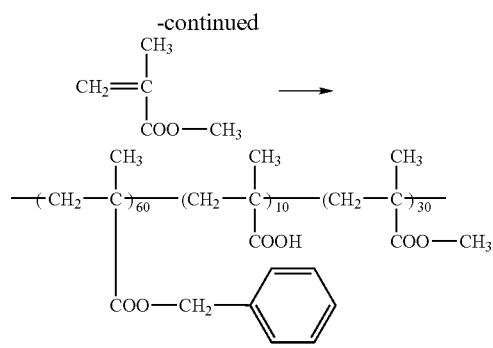

P-1

88 g of methyl ethyl ketone was placed in a 1000 ml three-necked flask equipped with a stirrer and a condenser tube, and heated at 72° C. under a nitrogen atmosphere. A solution, in which 0.85 g of dimethyl-2,2'-azobisisobutylate, 60 g of benzyl methacrylate, 10 g of methacrylic acid, and 30 g of methyl methacrylate were dissolved in 50 g of methyl ethylketone, was added dropwise over three hours to the liquid. After the dropwise addition was completed, the reaction was further continued for one hour, a solution formed by dissolving 0.42 g of dimethyl 2,2'-azobisisobutylate in 2 g of methyl ethylketone was added to the reaction solution, heated to 78° C. and heated at this temperature for 4 hours. The thus obtained reaction solution was reprecipitated twice with a large and excessive quantity of hexane, and the precipitated resin was dried to obtain 96 g of resin dispersant P-1 (water-insoluble resin).

The composition of the obtained resin was confirmed by $^1$H-NMR and the weight average molecular weight (Mw) was 44,600, as obtained by a GPC method. Furthermore, the acid value of the polymer obtained in accordance with the method stipulated in the JIS Standard (JISK0070:1992), was 65.2 mgKOH/g.

Other resin dispersants (water-insoluble resin) in the invention can be synthesized in a similar manner.

<Production of Pigment Dispersion>

Production Example 1

10 parts by mass of pigment blue 15:3 (Phthalocyanine Blue A220 (trade name) manufactured by Dainichiseika Color & Chemicals Mfg. Co., Ltd.), 5 parts by mass of resin dispersant P-1 obtained as above, 42 parts by mass of methyl ethyketone, 5.5 parts by mass of an aqueous solution of NaOH (1N), and 87.2 parts by mass of ion exchange water were mixed, and the mixture was dispersed with the use of zirconia beads with a diameter of 0.1 mmΦ by a bead mill for 2 to 6 hours. Methyl ethylketone was removed from the obtained dispersion at 55° C. under reduced pressure, and a part of the water was removed to obtain a pigment dispersion PD-01 with a pigment concentration of 10.2% by mass.

The total concentration of the water-insoluble resin and the pigment in the pigment dispersion PD-01 is 15.3% by mass.

Production Example 2

10 parts of mass of pigment blue 15:3 (Phthalocyanine Blue A220 (trade name) manufactured by Dainichiseika Color & Chemicals Mfg. Co., Ltd.), 2 parts by mass of sodium oleate, and 88 parts by mass of ion exchange water were mixed, and the mixture was dispersed with the use of zirconia beads with a diameter of 0.1 mmΦ by a bead mill for 2 to 6 hours, and a pigment dispersion PD-02 with a pigment concentration of 10% by mass was obtained.

<Production of Resin Particle Dispersion>

Production Example 1

A mixed solution of 2,353 g of JONCRYL 537 ((trade name) concentration of 45.9% by mass; manufactured by BASF Japan), 1,080 g of sodium oleate and 167 g of ion exchange water was prepared in a reaction vessel. The obtained mixed solution was centrifuged at 13,000 rpm for 60 minutes, the supernatant was recovered, and a latex PL-01 (resin particle dispersion) was obtained. The volume average particle diameter of the resin particles in the resultant latex PL01 was 55 nm. The solid component (namely, quantity of resin particles) in the latex PL-01 was 31% by mass.

Production Example 2

19.8 g of a carboxylic acid salt type emulsifier (LATEMUL ASK (trade name); manufactured by Kao Corporation), 6 g of an aqueous solution of sodium hydroxide (5 mol/l), and 0.3 g of 2,2'-azobis(2-amidinopropane)dihydrochloride were uniformly dissolved in 120 g of water. The solution was heated to 70° C., and a monomer mixture of 25.9 g of styrene, 26.3 g of butylacrylate and 5.1 g of acrylic acid was added to the solution over two hours in a stream of nitrogen and, thereafter, the resultant mixture was heated at 70° C. for two hours and at 80° C. for three hours. After the mixture was cooled to room temperature, an aqueous solution of sodium hydroxide (1 mol/l) was added to the mixture while stirring so as to adjust the pH value to about 9, whereby a latex PL-02 (resin particle dispersion) was obtained. The volume average particle diameter of the thus obtained latex PL-02 was 115 nm. The solid content (namely, content of resin particles) of the latex PL-02 was 33% by mass.

Example 1

<Preparation of Ink Composition>

Next, using the pigment dispersion and the resin particle dispersion obtained in the above, the following components were agitated and fully mixed. Thereafter, the mixture was filtered with the use of a microfilter with an average pore size of 5.0 μm under reduced pressure, and an ink composition was obtained.

| | |
|---|---|
| Pigment dispersion PD-01 | 40 parts by mass |
| Latex PL-01 | 26 parts by mass |
| SUNNIX GP-250 ((trade name) manufactured by Sanyo Chemical Industries, Ltd.) | 10 parts by mass |
| Diethyleneglycol monoethylether (DEGmEE) | 5 parts bay mass |
| Urea | 10 parts by mass |
| OLFIN E1010 ((trade name), manufactured by Nisshin Chemical Industry Co., Ltd.) | 1 part by mass |
| Ion exchange water | 8 parts by mass |

Examples 2-8, and Comparative Examples 1-6

Ink compositions were prepared in a manner similar to Example 1, except that the components of the ink compositions were changed to the composition as shown in Table 1. In Table 1, the numeral of each component expresses the content (parts by mass).

<Evaluation of Ink Composition>
(Dispersion Stability)

The particle diameter and the viscosity of the ink compositions obtained in the above were measured after the ink composition was stored in a thermostat oven at 60° C. for 14 days, and were evaluated in accordance with the following criteria. The results are shown in Table 1.

—Evaluation Criteria—

A: Change of particle diameter is within 10% relative to the initial particle diameter.

B: Change of particle diameter exceeds 10% and 30% or less relative to the initial particle diameter.

C: Change of particle diameter exceeds 30% relative to the initial particle diameter.

Measurement of Diameter of Particles

The volume average particle diameter of the obtained pigment dispersions was measured by a dynamic light scattering method using NANOTRAC particle size distribution measuring device UPA-EX150 ((trade name) manufactured by Nikkiso Co., Ltd.). Measurement conditions: A solution to be measured was prepared by adding 10 ml of ion exchange water to 10 μl of an aqueous ink, and the volume average particle diameter was measured at 25° C.

(Wiping-Off Test)

An ink droplet (10 μl) was formed on a sufficiently washed slide glass, and was allowed to stand in situ under the conditions of a temperature of 30° C. and a relative humidity of 50% RH for 24 hours, and dried. The dried ink droplet was wiped off by applying a load of 200 g/cm$^2$ with a piece of cotton gauze after the gauze, which had been impregnated with pure water, was squeezed to such an extent water did not drip therefrom, and the wiping-off property was evaluated in accordance with the following evaluation criteria.

—Evaluation Criteria—

A: The ink droplet can be wiped off to the extent that the original shape of the ink droplet on the slide glass is not recognizable.

B: The ink droplet can be wiped off to the extent that the original shape of the ink droplet on the slide glass is recognizable, but the amount of ink adhered to the gauze is large.

C: The amount of ink adhered to the gauze is small.

D: Hardly any of the ink can be wiped off.

As an inkjet recording apparatus, DIMATIX MATERIAL PRINTER DMP-2831 ((trade name) manufactured by Fuji Film Dimatix Inc.) using a test print head with 600 dpi and 256 nozzle, was used (the 10 pl ejection cartridge DMC-11610 ((trade name) manufactured by Fuji Film Dimatix Inc.) was modified such that a liquid can be supplied to the cartridge from the outside), and the following evaluations were performed. As a recording medium, TOKUBISHI ART double-faced N ((trade name) manufactured by Mitsubishi Paper Mills, Ltd. (basis weight: 89.4 g/m$^2$) was used.

(Curl)

An inkjet recording medium after a solid image was printed on the medium in an ink applied amount of 5 g/m$^2$, was cut out in a size of 5 mm×50 mm in the curling direction, and was allowed to stand for 24 hours under the conditions of a temperature of 25° C. and a humidity of 50%, and a curling behavior was evaluated in accordance with the following evaluation criteria.

—Evaluation Criteria—

A: Curvature C does not exceed 10.

B: Curvature C exceeds 10 and less than 20.

C: Curvature C exceeds 20.

—Method of Measuring Curvature—

A sample which was cut out in a size of 5 mm×50 mm in the curling direction was applied to a curl measurement plate, and a curl value (C) was read. The curl of the sample was regarded as an arc of a circle with a radius of R, and the curl was calculated according to the following equation; $C=1/R$ (m)

(Fixation)

A solid image was outputted in an ink applied amount of 10 g/m$^2$ using an inkjet recording apparatus, and after the image was dried and fixed by repeating the process of heating and pressing the image on a recording medium with a PFA roller at a temperature of 90° C. and a nip pressure of 1.0 MPa, five times. After the sample was allowed to stand 24 hours, the fixability of the image to the recording medium was evaluated according to the following evaluation method and the evaluation criteria.

—Evaluation Method—
(1) When SCOTCH mending tape ((trade name) manufactured by 3M Company) 12 mm in width is adhered onto the image, and peeled off, the image is not damaged.
(2) 60° glossiness of the image is greater than 55.
(3) A recording medium, TOKUBISHI ART double-faced N ((trade name) manufactured by Mitsubishi Paper Mills, Ltd. (basis weight: 89.4 g/m$^2$)), on which an image is not printed, is superposed on an image recorded medium, and after the superposed medium is rubbed with 20 mm stroke reciprocal motion ten times under a load of 200 g, no damage to the image is observed.

—Evaluation Criteria—

A: All the three conditions in the above are satisfied.

B: Any one of the three conditions is not satisfied.

C: Two or more of the above conditions are not satisfied.

The evaluation results for each ink are shown in Table 1.

TABLE 1

| | | Example 1 | Example 2 | Example 3 | Example 4 | Example 5 | Example 6 | Example 7 |
|---|---|---|---|---|---|---|---|---|
| Pigment Dispersion | PD-01 | 40 | 29 | 34 | 36 | 38 | 32 | 30 |
| | PD-02 | | | | | | | |
| Resin particle Dispersion | PL-01 | 26 | | 16 | | 24 | 22 | |
| | PL-02 | | 19 | | 24 | | | 30 |
| Water-soluble Organic Solvent | SUNNIX GP250 (SP26.4) | 10 | 5 | 14 | | 20 | 15 | 20 |
| | Glycerin (SP41.0) | | | | | | | |
| | DEGmEE (SP22.4) | 5 | | | 29 | 5 | | |
| | TEGmBE (SP21.1) | | 20 | | | | 10 | |
| | DEG (SP30.6) | | | | | | | 10 |
| | DPG (SP27.1) | | | 7 | | | | |
| Solid Wetting Agent | Urea | 10 | | 5 | 7 | | | |
| | N,N-dimethyl urea | | 7 | | | 5 | | |
| | Ethylene urea | | | | 3 | | | 8 |
| | TMP | | | | | | | |
| | Xylitol | | | | | | 8 | |
| OLFIN E1010 | | 1 | 1 | 1 | 1 | 1 | 1 | 1 |
| Ion Exchange Water | | 8 | 19 | 23 | | 7 | 12 | 1 |
| Stability | | A | A | A | A | A | A | A |
| Wiping-off Test | | A | A | A | A | A | A | A |
| Curl | | A | A | A | A | A | A | B |
| Fixability | | A | A | A | A | A | A | A |

| | | Example 8 | Comp. Example 1 | Comp. Example 2 | Comp. Example 3 | Comp. Example 4 | Comp. Example 5 | Comp. Example 6 |
|---|---|---|---|---|---|---|---|---|
| Pigment Dispersion | PD-01 | 10 | 36 | 35 | | 30 | | 34 |
| | PD-02 | | | | 39 | | 35 | |
| Resin particle Dispersion | PL-01 | 20 | 6 | | | 12 | | 16 |
| | PL-02 | | | 2 | 30 | | | |
| Water-soluble Organic Solvent | SUNNIX GP250 (SP26.4) | 10 | | 10 | 20 | | 15 | 14 |
| | Glycerin (SP41.0) | | 10 | | | 20 | | |
| | DEGmEE (SP22.4) | | | 5 | 5 | | | |
| | TEGmBE (SP21.1) | 5 | 2 | | | 5 | | |
| | DEG (SP30.6) | | | 5 | | | | |
| | DPG (SP27.1) | | | | | | 5 | 7 |
| Solid Wetting Agent | Urea | 8 | | 3 | | | | 3 |
| | N,N-dimethyl urea | | | | 5 | | | |
| | Ethylene urea | | | | | | | |
| | TMP | | 2 | | | 2 | | |
| | Xylitol | | | | | | | |
| OLFIN E1010 | | 1 | 1 | 1 | 1 | 1 | 1 | 1 |
| Ion Exchange Water | | 46 | 38 | 44 | | 30 | 44 | 25 |
| Stability | | A | A | A | C | A | C | A |
| Wiping-off Test | | A | B | B | B | B | B | C |
| Curl | | A | C | A | A | C | A | A |
| Fixability | | A | C | C | A | C | C | A |

(Parts by mass)

-Explanation of Table 1-

The numerals in the parentheses after each water-soluble organic solvent name in Table 1 are the SP value.

DEGmEE: Diethylene glycol monoethyl ether

TEGmBE: Triethylene glycol monobutyl ether

DEG: Diethylene glycol

DPG: Dipropylene glycol

TMP: Trimethylol propane

SUNNIX GP-250 (trade names) manufactured by Sanyo Chemical Industries, Ltd. is polyoxypropylene glyceryl ether represented by the following formula:

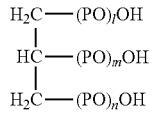

$l + m + n = 3$ (SP Value; 26.4)
PO = Propyleneoxy

As shown in Table 1, the ink compositions of Examples 1-8 are excellent in the dispersion stability, the fixability to the recording medium, and the wiping-off property at the time of the ink compositions being dried and solidified. Moreover, the occurrence of curling of the recording media on which images are recorded is suppressed.

In the ink composition described in JP-A No. 2006-273891, when the addition amount of resin particles for the purpose of improving the fixability of the ink composition to a recording medium is increased, the wiping-off of the ink composition may become difficult (namely, wiping-off property becomes worse). For example, when the ink composition is dried and solidified in the vicinity of an ink ejecting nozzle, this trend becomes more noticeable.

According to the present invention, an ink composition having an excellent dispersion stability, fixability to a recording medium and wiping-off property, and an image forming method using the ink composition can be provided.

What is claimed is:

1. An ink composition comprising pigment particles covered with a water-insoluble resin, resin particles, a water-soluble organic solvent, water, and a solid wetting agent in an amount of 5% by mass or more,
   wherein the water-soluble organic solvent comprises at least one alkyleneoxide adduct of glycerin; and
   the at least one alkyleneoxide adduct of glycerin includes a compound represented by Formula (1):

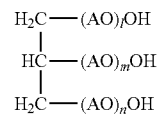

Formula (1)

wherein in Formula (1), AO represents an ethyleneoxy group and/or a propyleneoxy group, provided that the AO in the $(AO)_l$, $(AO)_m$ and $(AO)_n$ in formula (1) may be the same respectively, or may be different from one another; l, m and n each independently represents an integer of 1 or more and the relationship of $3 \leq l+m+n \leq 15$ is satisfied.

2. The ink composition according to claim 1, wherein the solid wetting agent is at least one wetting agent selected from urea or urea derivatives.

3. The ink composition according to claim 1, wherein the resin particles are contained in an amount of 5% by mass or more with respect to the total mass of the ink composition.

4. The ink composition according to claim 1, wherein the pigment particles are covered with the water-insoluble resin by a phase-inversion emulsifying method.

5. The ink composition according to claim 1, wherein the water-insoluble resin has a hydrophobic structural unit and a hydrophilic structural unit, and the hydrophobic structural unit comprises a first structural unit having an aromatic ring bonded through a linking group to an atom forming a main chain of the structural unit in an amount of 40% by mass or more with respect to the total mass of the water-insoluble resin, and a second structural unit derived from an alkyl ester having 1-4 carbon atoms of (meth)acrylic acid in an amount of 15% by mass or more with respect to the total mass of the water-insoluble resin, and, the hydrophilic structural unit comprises a third structural unit derived from (meth)acrylic acid in an amount of 15% by mass or less with respect to the total mass of the water-insoluble resin.

6. An image recording method including applying the ink composition according to claim 1 to a recording medium by an inkjet method.

7. The image recording method according to claim 6, wherein the method further comprises fixing the ink composition applied to the recording medium by at least heating.

* * * * *